US011138608B2

(12) United States Patent
Green

(10) Patent No.: US 11,138,608 B2
(45) Date of Patent: Oct. 5, 2021

(54) AUTHORIZING MULTIPARTY BLOCKCHAIN TRANSACTIONS VIA ONE-TIME PASSWORDS

(71) Applicant: International Business Machines Corporation, Armonk, NY (US)

(72) Inventor: Matthew Green, Canberra (AU)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 16/021,162

(22) Filed: Jun. 28, 2018

(65) Prior Publication Data

US 2020/0005296 A1 Jan. 2, 2020

(51) Int. Cl.
| | |
|---|---|
| *G06Q 30/00* | (2012.01) |
| *G06Q 20/40* | (2012.01) |
| *G06Q 20/38* | (2012.01) |
| *G06Q 20/32* | (2012.01) |
| *H04L 9/32* | (2006.01) |
| *H04L 9/06* | (2006.01) |

(52) U.S. Cl.
CPC ....... *G06Q 20/401* (2013.01); *G06Q 20/3278* (2013.01); *G06Q 20/3825* (2013.01); *H04L 9/0643* (2013.01); *H04L 9/3228* (2013.01); *H04L 9/3247* (2013.01); *H04L 2209/38* (2013.01)

(58) Field of Classification Search
CPC .................................................. G06Q 20/401

USPC ......... 705/44, 1.1, 77, 68, 37, 39, 14.48, 64; 700/91
See application file for complete search history.

(56) References Cited

U.S. PATENT DOCUMENTS

| | | | |
|---|---|---|---|
| 8,024,576 B2 * | 9/2011 | Gargaro ............. | G06Q 20/4012 713/183 |
| 2015/0089607 A1 | 3/2015 | Hubner et al. | |
| 2017/0041148 A1 | 2/2017 | Pearce | |
| 2017/0140145 A1 * | 5/2017 | Shah ...................... | G16H 40/63 |
| 2018/0019872 A1 * | 1/2018 | Radocchia ............ | H04L 9/3271 |

FOREIGN PATENT DOCUMENTS

WO   2014141263 A1   9/2014

OTHER PUBLICATIONS

NPL Search.*
ProQuestDialogNPL Search History.*
Aboshosha et al. "Multi-channel user authentication protocol based on encrypted hidden OTP." International Journal of Computer Science and Information Security 13.6 (2015): 14.(Related).

(Continued)

*Primary Examiner* — John H. Holly

(57) ABSTRACT

An example operation may include one or more of creating a proposed transaction including one or more assets, transmitting the proposed transaction to a user device for authorization, receiving authorization from the user device via an asynchronous one-time password to authorize the proposed transaction, and creating a blockchain transaction including the asynchronous one-time password and content of the proposed transaction responsive to receiving the authorization.

14 Claims, 10 Drawing Sheets

100

(56) References Cited

OTHER PUBLICATIONS

Fukumitsu et al. "A Proposal of a Secure P2P-Type Storage Scheme by Using the Secret Sharing and the Blockchain." Advanced Information Networking and Applications (AINA), 2017 IEEE 31st International Conference on. IEEE, 2017. (Related).
Lim, et al. "The Analysis and Countermeasures on Security Breach of Bitcoin." International Conference on Computational Science and Its Applications. Springer, Cham, 2014. (Background).
Sukma et al., . "One time key Issuing for Verification and Detecting Caller ID Spoofing Attacks." Computer Science and Software Engineering (JCSSE), 2017 14th International Joint Conference on. IEEE, 2017.(Related).
Wu, Longfei, et al. "An Out-of-band Authentication Scheme for Internet of Things Using Blockchain Technology." (2017). (Related).

* cited by examiner

AUTHORIZING MULTIPARTY BLOCKCHAIN TRANSACTIONS VIA ONE-TIME PASSWORDS

TECHNICAL FIELD

This application generally relates to authorizing parties to a network, and more particularly, for authorizing multiparty blockchain transactions via one-time passwords.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, Internet of things (IoT) technology may require two or more parties to authorize a blockchain transaction. If multiple parties have to sign a transaction then the ability to maintain secrecy of private keys may be an issue. As IoT continues to grow in popularity there are remaining security concerns involving the scope and consequences of inadequate security. Blockchain technology can alleviate certain security concerns associated with IoT by limiting and guaranteeing the scope of transactions and by providing cryptographically provable authorization of transactions before they occur. In IoT devices, such permissions may be stored on a blockchain. While a device may have the needed access to order a product in a blockchain-based online marketplace, the owner of the device may need to explicitly permit the transaction before it is accepted.

Currently, there are two popular methods of authorizing a device to conduct transactions on the owner's behalf. One approach includes a user operating their user device to provide their private key, which processes the transaction. A smartphone or smart device is used to sign or encrypt a transaction. This could be a single signature for a transaction or some form of a multi-signature transaction. Specialized cryptographic hardware is used to receive and sign/encrypt a transaction before sending it to the device or blockchain for processing. Providing private keys to all the IoT devices in a home or office is impractical. Storing keys on a general purpose smartphone risks the private key being compromised and requires the user to interact with their phone, which detracts from the "easy-life" IoT promises to provide users of such systems. Specialized hardware can be developed to solve these concerns but has a significant development cost and risks being compromised as well. On top of the user experience and security challenges, those concerns must be resolved for cheap costs and lower power hardware, which is a challenge with the processing costs of asymmetric cryptography.

SUMMARY

One example embodiment may provide a method that includes one or more of creating a proposed transaction comprising one or more assets, transmitting the proposed transaction to a user device for authorization, receiving authorization from the user device via a one-time password, and creating a blockchain transaction comprising content of the proposed transaction responsive to receiving the authorization.

Another example embodiment may include a system that includes a user device, and a computing device configured to one or more of create a proposed transaction comprising one or more assets, transmit the proposed transaction to the user device for authorization, receive authorization from the user device via an asynchronous one-time password to authorize the proposed transaction; and create a blockchain transaction with the asynchronous one-time password and content of the proposed transaction responsive to the authorization being received.

Still another example embodiment may include a non-transitory computer readable storage medium configured to store instructions that when executed cause a processor to perform one or more of creating a proposed transaction comprising one or more assets, transmitting the proposed transaction to a user device for authorization, receiving authorization from the user device via an asynchronous one-time password to authorize the proposed transaction, and creating a blockchain transaction comprising the asynchronous one-time password and content of the proposed transaction responsive to receiving the authorization.

DETAILED DESCRIPTION

Figure 1:
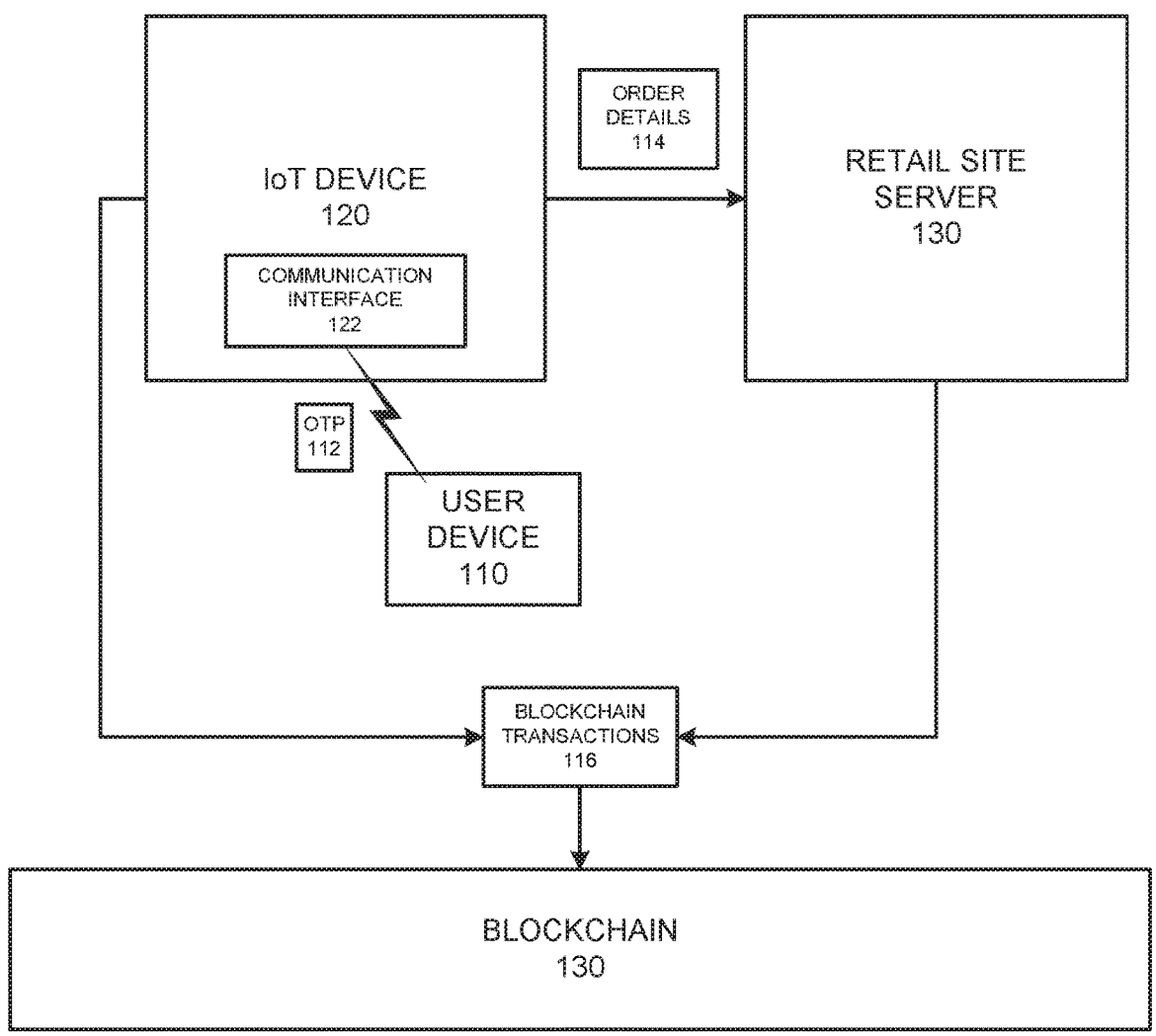
FIG. 1 illustrates a network configuration for using a one-time password with a IoT device to conduct transactions on a blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide procedures for authorizing multiparty blockchain transactions using one-time password authorization. To ensure security, IoT transactions should not require a user device to forgo private keys simply just to conduct a transaction. A one-time password may be used to authorize transactions on a blockchain. For example, considering IoT devices are communicating via wireless communication protocols, a one-time password that uses RFID/NFC communication protocol technology may be a secure way to securely access resources outside the network. A one-time password hardware token is one way to store private keys while still being readily useable for authentication and authorization. Exposing one-time passwords on a blockchain creates risks for exposing the passwords to man-in-the-middle attacks. Multiparty transactions can reduce the likelihood of attacks by requiring the final party to sign the transaction.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockhcain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

One example of an IoT network that utilizes one-time passwords for security enhancement may provide a network IoT device, such as a refrigerator that is linked to a blockchain marketplace to place orders for groceries. The device may transmit inquiries to a user device and/or user via a voice recognition interface that inquires to the user/user device if he or she would like to order some groceries via online grocery services. The refrigerator device is authorized to place orders from the online grocery store but may not have authorization to make a purchase or confirm an order without additional permissions. The authorization for the order is received from the user device by one of many different approaches. In one example, the user may wave a one-time password (OTP) token device against the refrigerator device, and via near-field communication (NFC), Bluetooth, radio frequency identification (RFID), etc., the authentication may be authorized. The refrigerator device receives the OTP and is now able to place the order on the blockchain network as a blockchain transaction by listing the user's OTP in the transaction as data that will be encrypted but is otherwise susceptible to audits. The one-time password (OTP) data is written to the transaction and maintained in the immutable ledger. The OTP may be a symmetric OTP which requires users of the blockchain to have the shared private key to verity the OTP when used. However, asymmetric OTPs may also be used since the peers may use a public key to verity the asymmetric OTP.

In operation, a multiparty blockchain transaction may use a one-time password for secondary parties as well. An example of multiparty transactions is an IoT refrigerator that attempts to order groceries via an online service market. The refrigerator is authorized to create a shopping cart for a specific grocery store, but authorization of the notification requires the purchaser to provide their OTP. In one example, the refrigerator may identify a product deficiency and notify the user via a message, a screen, etc. The user may identify the item and speak the name of the item out-loud so the voice can be recorded and converted to text via a messaging application that updates the user's mobile device. The shopping list may be generated on the user's mobile device, in the memory of the refrigerator and/or in a cloud memory source.

An example transaction may appear for a particular grocery store that shares its public key with the refrigerator device. The transaction and data exchanged may include a list of public keys, such as: Grocery Store ABC: a1b18347ab9d8e9832176382a8ebd87a898b2b82564bc62a5 6bd536482bcd3b49, the user's OTP: 87aabcd2b82564bc62a56bd536482bcd3b49967a8347ab9 d8e9832176382a8dba, the refrigerator may key: 2ba9dba1f3c43cab23fadc6a198aba672bcb864626bd53648 2bcd3b9683ab8e3263a8a. The transaction data may include data, such as: (User ID refrigerator—>ABC grocery store), time: 1510744499 (optional), HASH ID: a72ha72b38294b19381b8abc893123bab89c898ba893421 92bacdef9a823213d1, from: 2ba9dba1f3c43cab23fadc6a198aba672bcb864626bd5364 82bcd3b9683ab8e3263a8a, User ID's OTP: bcd293aa64a8b82502a536ab6bd5bccd9682ba4983478e98 769d328238dba638d, To: a1b18347ab9d8e9832176382a8ebd87a898b2b82564bc62a 56bd536482bcd3b49, Shopping Cart: "Orange Juice", "Carrots", "Milk" (shopping cart option 1), Shopping Cart Hash ID: 72ba82ba87d9821090989ab293820e89 (shopping cart option 2), Amount: XYZ and Signed: ab73bc8d8ba82b1db128ba7200abd72930a0ab93810293ba d90a8d8d9a8d976a52bc.

FIG. 1 illustrates a network configuration for using a one-time password with a IoT device to conduct transactions on a blockchain network, according to example embodiments. Referring to FIG. 1, the network 100 includes an IoT device 120 which serves to operate as a transaction initiator and executor for actions taken, such as ordering a product, communicating information with a third party server, communicating with other IoT devices, communicating with a master controller (i.e., user device). The scenario included in this example includes the user device 110 communicating wirelessly to the IoT device 120 via a communication interface 122 to receive a request for a purchase order and requesting a OTP 112 to confirm the authorization for placing the order with the retail server 130. In operation, the confirmed order is dispatched as an order with a detailed product description 114. The purchase, requests, confirmations, etc., may all be placed in a blockchain transaction(s) 116, which is forwarded to the immutable ledger 130.

In one example, in order to create a blockchain transaction based on the communication between the user device and the IoT device, the IoT device may create a virtual shopping cart of all the groceries to order via an online merchant site, such as ABC store, and request a verifiable hash ID to confirm the order information. A verifiable hash ID could be created by hashing the time, the IDs associated with the parties, and the contents of the purchase order. The details of the order and the various contents may be included in the transaction details. For example, the user's refrigerator may add items to the list of order details and to the transaction details. The proposal for the purchase order may then be sent to the user device for confirmation of the order and confirmation of the purchase. To confirm the order, the user device 110 may transfer an OTP 112 to the refrigerator 120 by proximity communication via a NFC and/or RFID enabled OTP hardware token that is sent from the user device 110 and received by the IoT device 120. The OTP is wirelessly transferred from a smartphone or other communication device, such as a wearable device. Another option would be to identify the OTP, such as a time changing microcontroller display device and reading the OTP details aloud via voice and having the IoT device 120 identify the words and enter the data for authorization. A user may also enter the OTP on a screen via a touchpad interface. The IoT device 120 may submit the blockchain transaction and sign the transaction with a private key before distributing the transaction to the blockchain. When the transaction is added to the blockchain, the retail site can confirm the transaction is valid and process the order accordingly. This confirmation may include forwarding details to another third party site to process a transaction and/or by verifying the transaction included the correct information in the transfer.

The approach of having the IoT device receive OTP confirmation and conduct transactions reduces the overall risk when private keys are lost. Certain risks, which may include the private keys being stolen by a cyberthief, would result in the thief being unable to place an order or authorize the transactions without permission since the OTP is still required to conduct the transaction in addition to the private keys. Also, if the OTP is leaked, the short life of the OTP (i.e., 60 seconds) shortens a thief's time to place an attack. Even with an OTP, the thief does not have authorization to place orders and therefore cannot use the OTP in the marketplace. The asymmetric OTP may be used to authorize the transactions.

A smart contract could be used as well to manage transactions, such as products that have been delivered and corresponding results of the user and/or merchant accounts. For example, once a shopping list of items are delivered to a user's home, the asymmetric OTP could be used to authorize the smart contract to conduct the transaction for the user account and the store account.

Figure 2A:
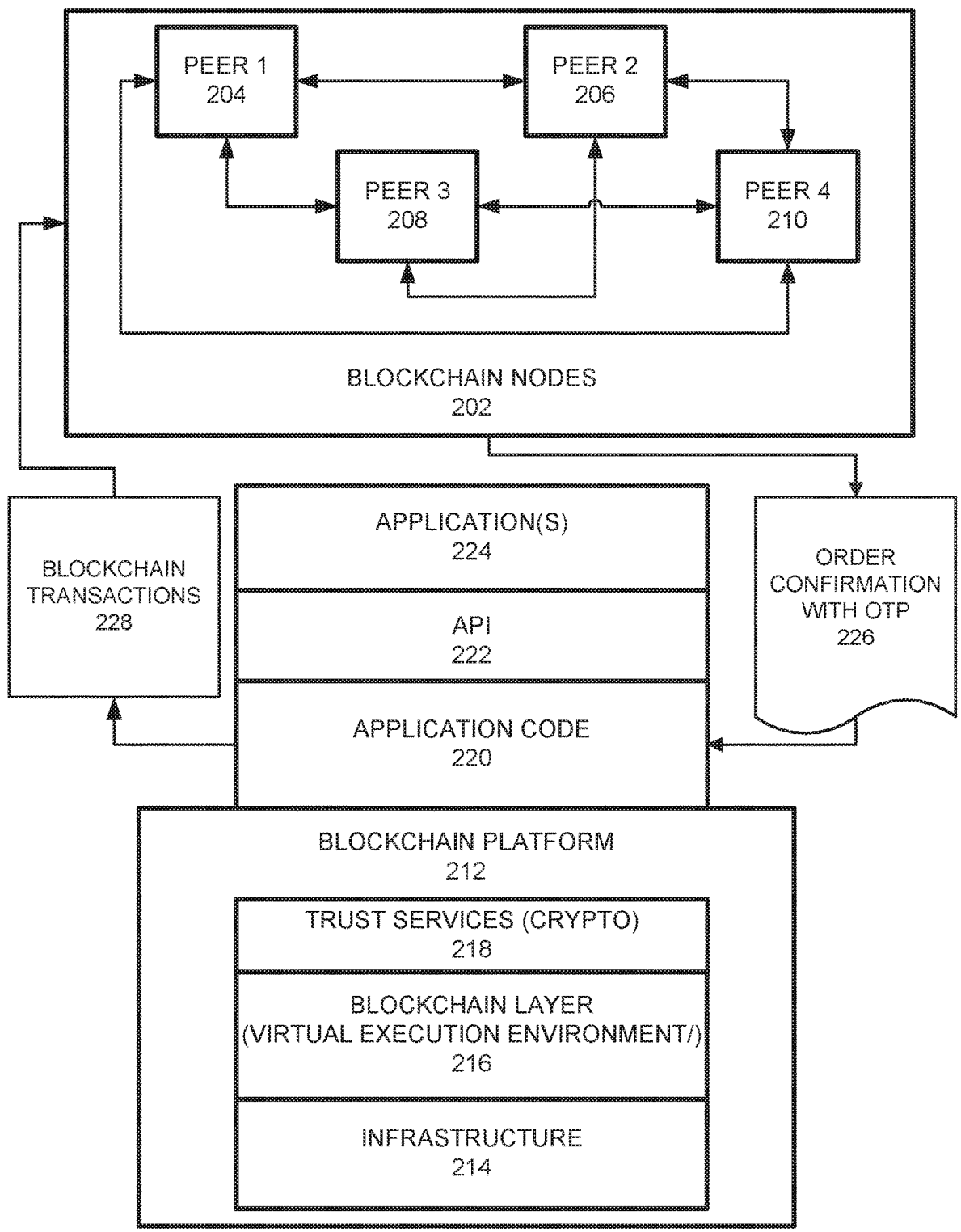
FIG. 2A illustrates an example peer node blockchain architecture configuration for performing blockchain operations, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, an order or request for assets (i.e., products) may be sent to a user for authorization and used as the basis to create a blockchain 226. Once the transaction is created and authorized, the blockchain peers may receive the transaction(s) 228 for committance to the blockchain.

Figure 2B:
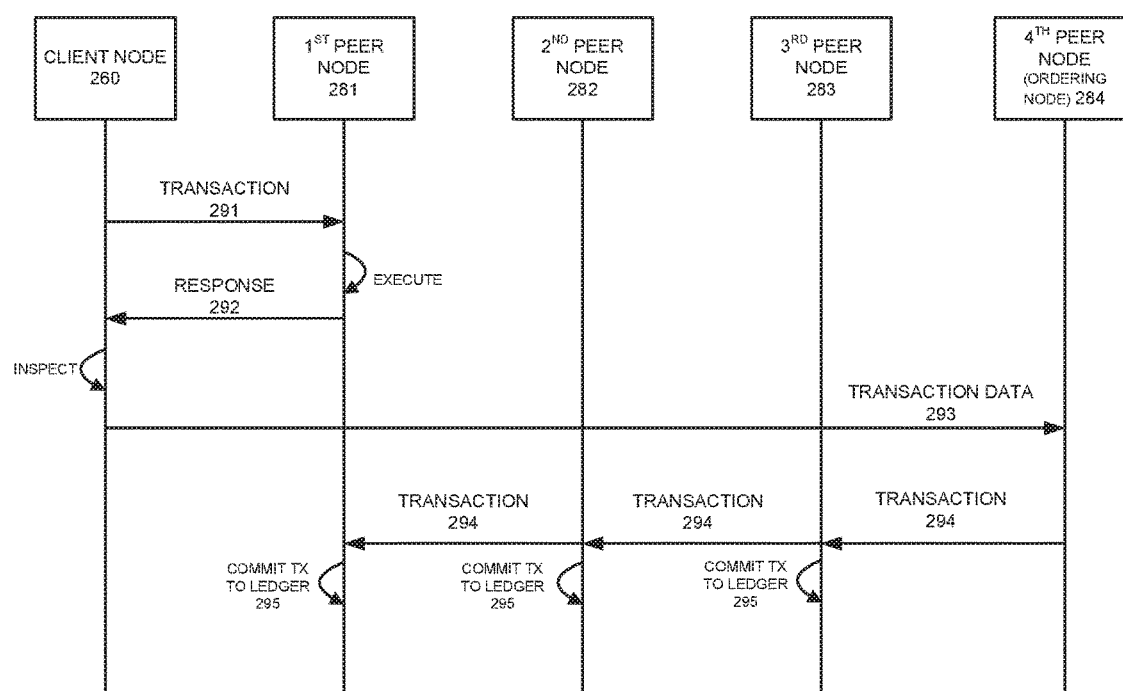
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
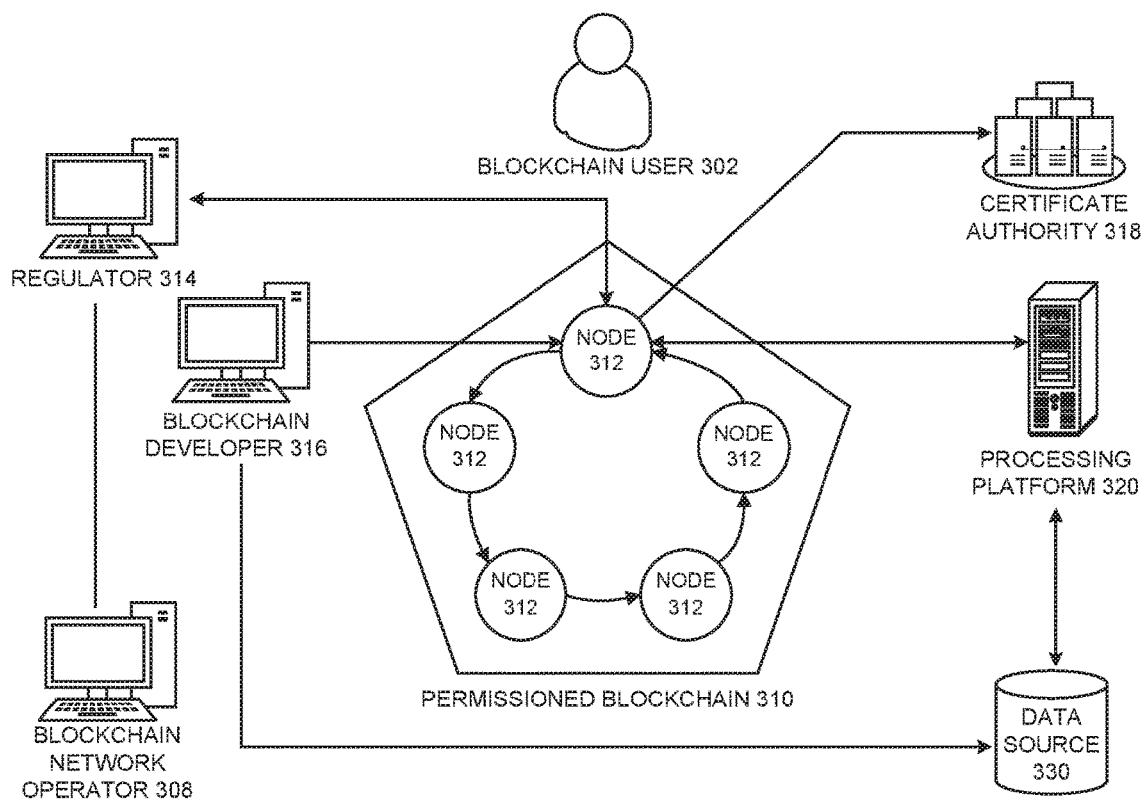
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

One example transaction may include: Time: 1525737610 (0x5AF0E88A), HASH: 0xa72ha72b38294b19, From: 0x2ba9dba1f3c43cab (This is the Fridge's public key), B's Asynchronous OTP: 0xbcd293aa64a8b825 (The Asynchronous OTP is generated using B's Private key), B's Public Key: 0x9ba85734a392bacd, To: 0xa1b18347ab9d8e98 (Shop's public key), Shopping Cart: 0x02 (2 items) 0xa2 (Orange Juice) 0x, 0xb7 (Milk), Amount: 0x00000514 ($13), Sign: 0xab73bc8d8ba82b1d (This signature is generated using the Fridge's private key). The transaction could be stored as: 5A F0 E8 8A a7 2h a7 2b 38 29 4b 19 2b a9 db a1; f3 c4 3c ab bc d2 93 aa 64 a8 b8 25 9b a8 57 34; a3 92 ba cd a1 b1 83 47 ab 9d 8e 98 02 a2 b7 00; 00 05 14 ab 73 bc 8d 8b a8 2b 1d. The blockchain clients can verify the asynchronous OTP with B's public key (VerifyOTP (0x9ba85734a392bacd,0xbcd293aa64a8b825)).

In one example, a user may own a smart 'fridge' that can place orders on a blockchain for new groceries. In general, a blockchain may require users to provide their private key with their fridge. If the fridge is insecure the private key could be leaked or the fridge could be misused which may cause malicious parties to make fraudulent orders. If the fridge malfunctions then the fridge could place unauthorized orders to the blockchain. Instead of providing the fridge with the user's private key, the user could simply provide an asynchronous OTP that the fridge can use to authorize the transactions. This configuration is asynchronous since OTPs are short-lived and thus the fridge only has a short time to use the asynchronous OTP before it expires. The user's asynchronous OTP is stored as part of the blockchain transaction, and the user's public key is used to verify that the asynchronous OTP is valid at the time the order was placed.

Since the transaction is immutable the asynchronous OTP cannot be modified and permits parties to verify the transaction has a valid OTP. The use of public key cryptography permits signatures to be shared without exposing sensitive information and private keys, this also permits asynchronous OTPs to be shared. By using asynchronous OTPs with the blockchain, users may authorize transactions in a distributed decentralized manner. A traditional database cannot support this type of configuration since the requirements to verify that an asynchronous OTP is valid requires that the transaction be immutable, and that the OTP is not reused. The blockchain ensures that all transactions are immutable and cryptographically secure, which insures the transactions are not susceptible to a replay attack or a double play attack, where a malicious $3^{rd}$ party attempts to reuses the OTP to authorize a malicious transaction.

Example embodiments provide a system where the device 'fridge' does not need to store and protect the user's private key. The configuration adds the asynchronous OTP to the transaction as a new attribute. The asynchronous OTP is stored in the transaction and can be used to verify if the transaction was approved by the user. This configuration also removes the need for the devices to all share and sign the transaction. Asynchronous OTPs have a lower processing and power requirement then traditional transaction signatures. As a result, the user is not required to use an expensive device (e.g., smartphone) to sign the transaction. Much lower cost/profile devices can be used, such as an OTP hardware token, smartcards, etc.

Figure 4:
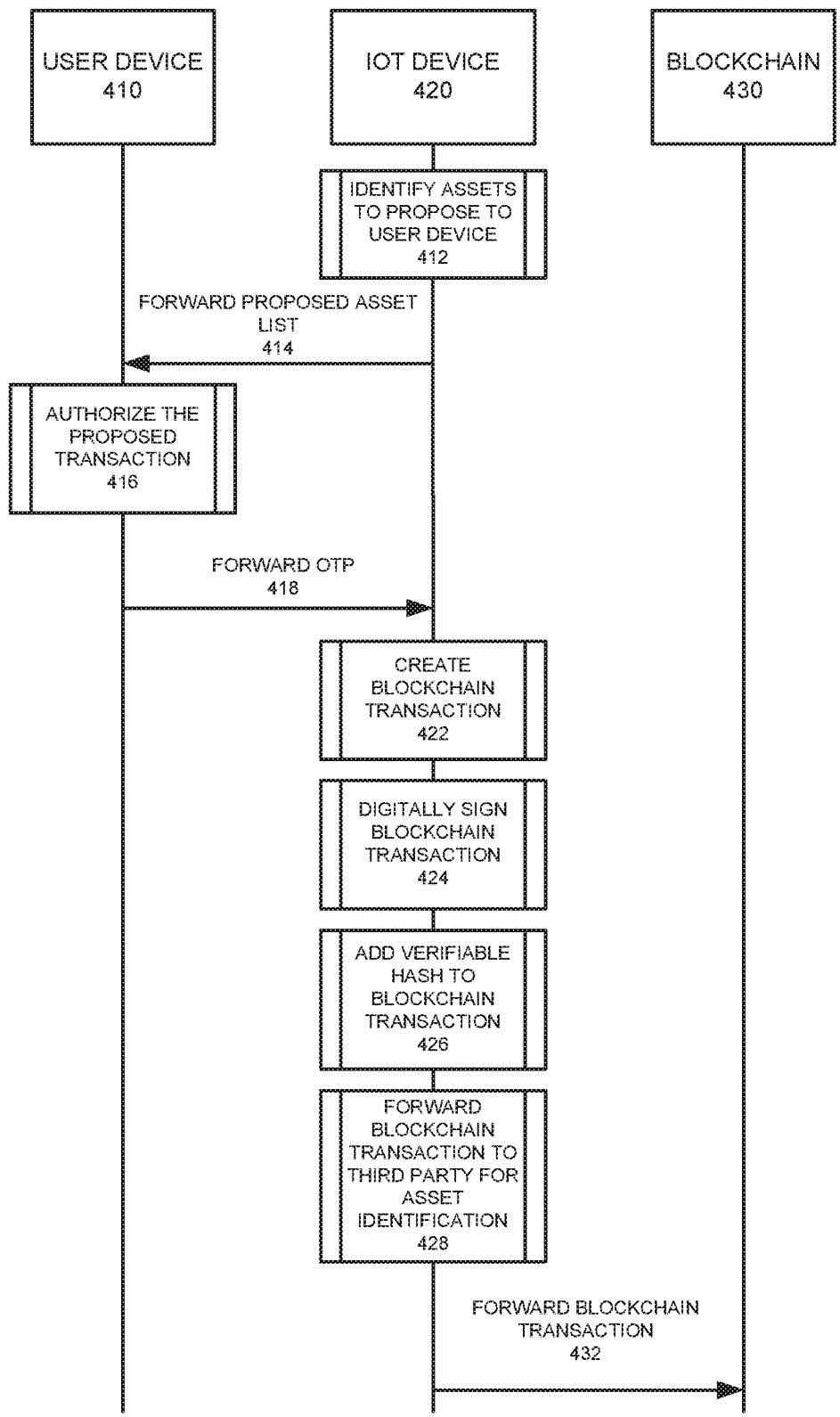
FIG. 4 illustrates a system messaging diagram for IoT transactions conducted on a blockchain, according to example embodiments.

FIG. 4 illustrates a system messaging diagram 400 for IoT transactions conducted on a blockchain, according to example embodiments. Referring to FIG. 4, the user device 410 may receive 414 a proposed list of assets 412 which are identified by the IoT device 420. The proposed transaction can then be authorized 416 and the OTP is forwarded 418 for authorization of the transaction. The IoT device may then create a blockchain transaction 422, digitally sign the transaction 424, add a verifiable hash 426 to the transaction for further authorization and security purposes and forward the finalized blockchain transaction to a third party for fulfillment of the assets 428. The transaction may then be forwarded 432 to the blockchain 430 for commitment.

Figure 5A:
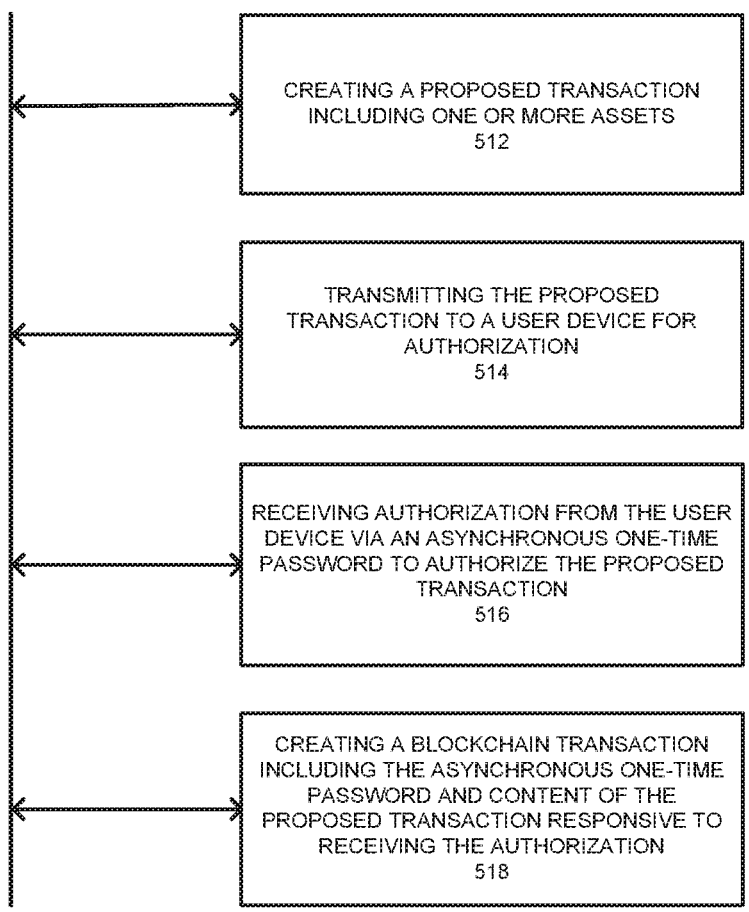
FIG. 5A illustrates a flow diagram of an example for IoT transactions conducted on a blockchain procedure, according to example embodiments.

FIG. 5A illustrates a flow diagram of an example for IoT transactions conducted on a blockchain procedure, according to example embodiments. Referring to FIG. 5A, the method 500 may include creating a proposed transaction including one or more assets 512, transmitting the proposed transaction to a user device for authorization 514, receiving authorization from the user device via an asynchronous one-time password 516, and creating a blockchain transaction including the asynchronous one-time password and content of the proposed transaction responsive to receiving the authorization 518. The method may also include creating a verifiable hash identifier to include in the transaction. The proposed transaction includes a list of the one or more assets created by an Internet of things (IoT) compatible device. The method may also include receiving a wireless communication message including the authorization from the user device. The wireless communication message includes one or more of a near field communication (NFC) message, a radio frequency identification (RFID) message, and a Bluetooth message. The method may also include digitally signing the blockchain transaction with a private key maintained by the IoT compatible device. Also, in one example, the blockchain transaction includes a timestamp, a hash ID, an origin address, a destination address, the one-time password, the private key, and the one or more assets.

Figure 5B:
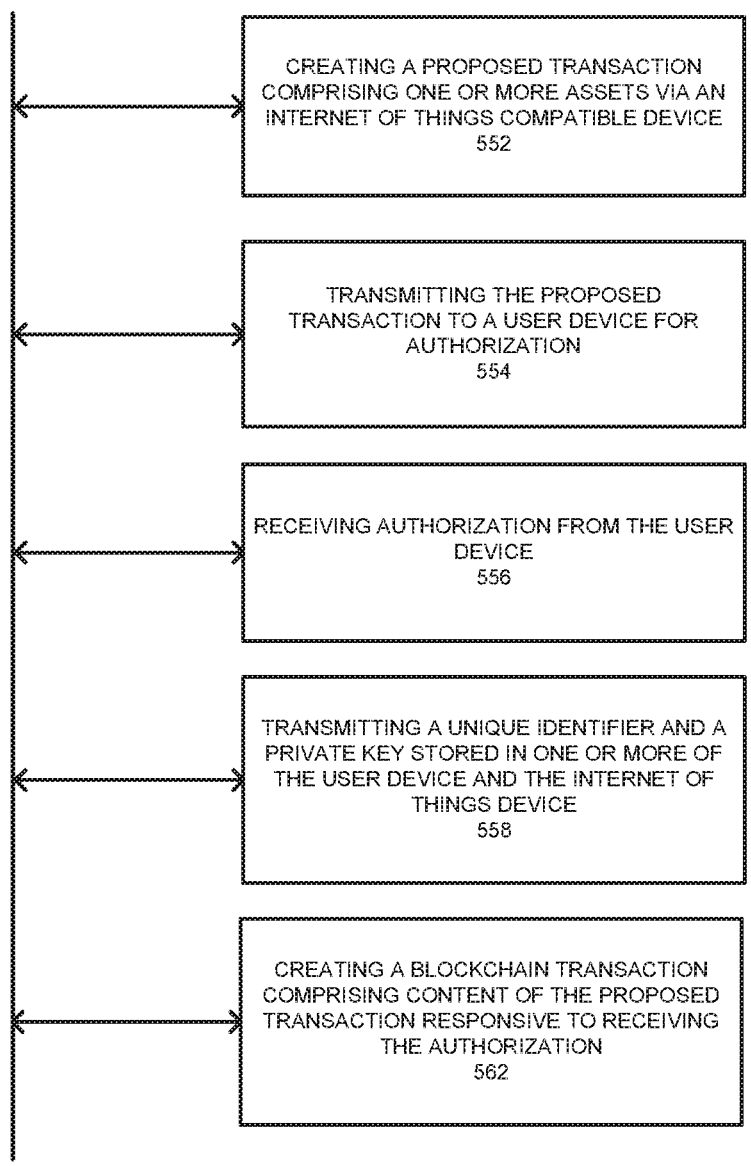
FIG. 5B illustrates a flow diagram of another example for IoT transactions conducted on a blockchain procedure, according to example embodiments.

FIG. 5B illustrates a flow diagram of another example for IoT transactions conducted on a blockchain procedure, according to example embodiments. This method 550 provides creating a proposed transaction comprising one or more assets via an Internet of things compatible device 552, transmitting the proposed transaction to a user device for authorization 554, receiving authorization from the user device 556, transmitting a unique identifier and a private key stored in one or more of the user device and the Internet of things device 558, and creating a blockchain transaction including content of the proposed transaction responsive to receiving the authorization 562.

In addition to providing authorization via the one-time password, the private key and identification may be stored in the IoT device and/or the user device in a secure hardware configuration. The information may be stored in both devices to verify the unique combination of private keys between the devices so a cyberthief will not be able to obtain all the necessary information required to steal the information and perform fraud since the information requires keys stored in both devices in order to verify the blockchain transaction and complete a purchase order or other asset related transaction.

Figure 6A:
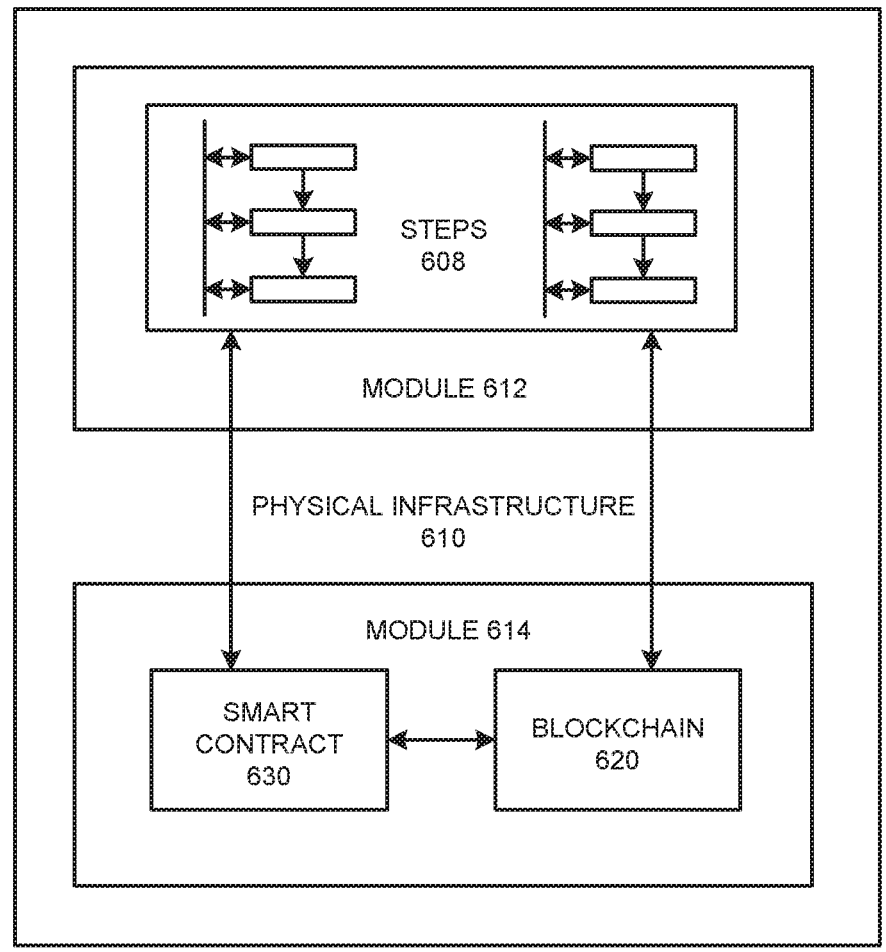
FIG. 6A illustrates an example physical infrastructure configured to perform various operations on the blockchain in accordance with one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
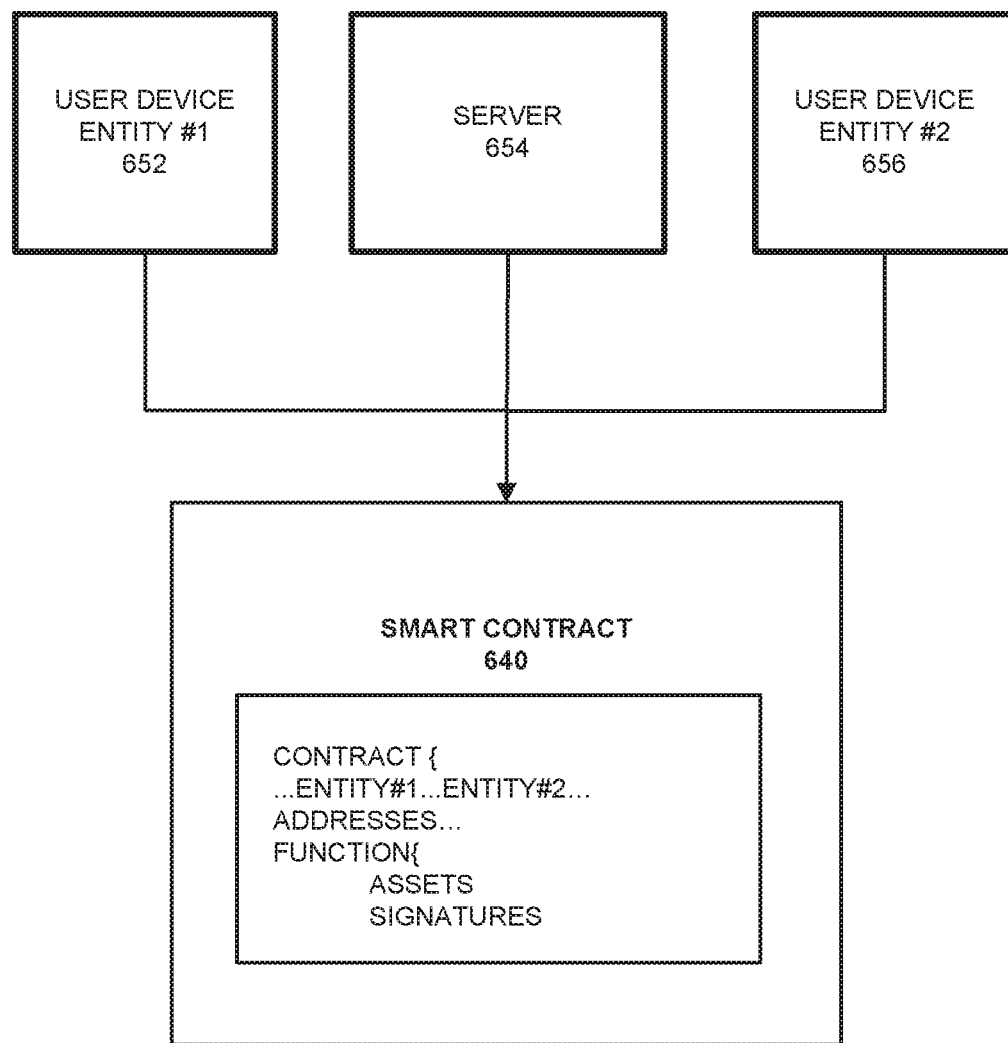
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
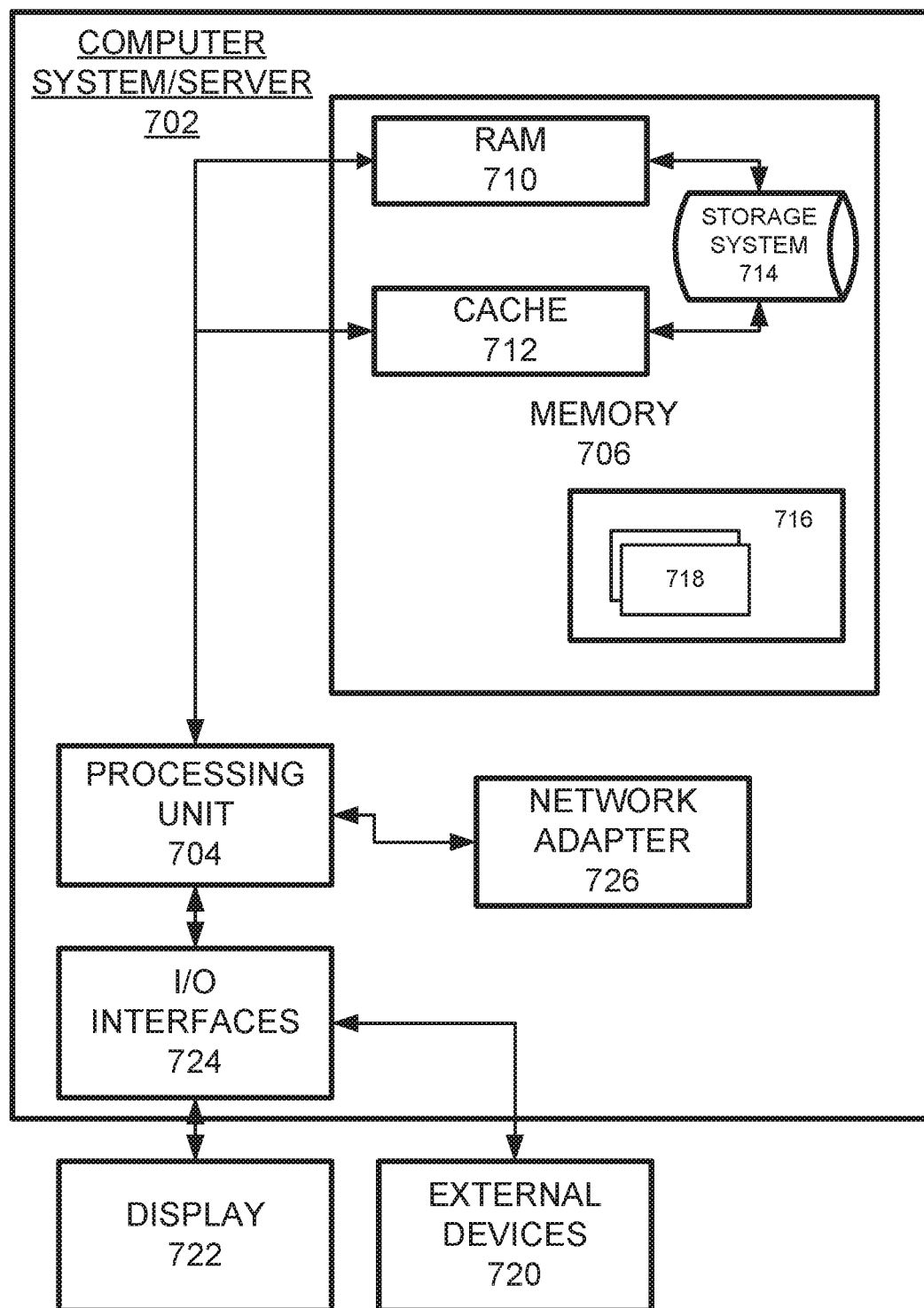
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    creating, via an Internet of Things (IoT) device, a proposed transaction comprising identifiers of one or more assets;
    receiving, via the IoT device, a wireless transfer of a one-time password by near-field communication from a hardware token disposed within a predetermined physical proximity to the IoT device, the one-time password being verifiable based on a public key of a user;
    generating, via the IoT device, a blockchain transaction comprising the one-time password that is verifiable based on the public key of the user, a public key of the IoT device, the public key of the authorized user, and content of the proposed transaction, responsive to receiving the wireless transfer;
    signing the blockchain transaction with a private key of the IoT device; and
    transmitting the signed blockchain transaction to a blockchain network.

2. The method of claim 1, further comprising:
    hashing the public key of the user, the public key of the IoT device, and the content of the proposed transaction, and storing a verifiable hash identifier of the hash in the blockchain transaction.

3. The method of claim 1, wherein the blockchain transaction comprises a list of the one or more assets generated by the IoT device.

4. The method of claim 1, wherein the receiving comprises receiving the one-time password via one or more of a near field communication (NFC) message, a radio frequency identification (RFID) message, and a Bluetooth message, transmitted by the hardware token being brought within the predetermined physical proximity of the IoT device.

5. The method of claim 1, wherein the blockchain transaction further comprises a timestamp, a hash ID, an origin address, and a destination address.

6. A system, comprising:
    a processor configured to
        create, via an Internet of Things (IoT) device, a proposed transaction comprising identifiers of one or more assets;

receive, via the IoT device, a wireless transfer of a one-time password by near-field communication from a hardware token disposed within a predetermined physical proximity to the IoT device, the one-time password being verifiable based on a public key of a user;

generate, via the IoT device, a blockchain transaction comprising the one-time password that is verifiable based on the public key of the user, a public key of the IoT device, the public key of the authorized user, and content of the proposed transaction, responsive to the wireless transfer, sign the blockchain transaction with a private key of the IoT device, and transmit the signed blockchain transaction to a blockchain network.

7. The system of claim 6, wherein the processor is further configured to hash the public key of the user, the public key of the IoT device, and the content of the proposed transaction, and store a verifiable hash identifier of the hash in the blockchain transaction.

8. The system of claim 6, wherein the blockchain transaction comprises a list of the one or more assets generated by the IoT device.

9. The system of claim 6, wherein the processor is configured to receive the one-time password via one or more of a near field communication (NFC) message, a radio frequency identification (RFID) message, and a Bluetooth message, transmitted by the hardware token being brought within the predetermined physical proximity of the IoT device.

10. The system of claim 6, wherein the blockchain transaction further comprises a timestamp, a hash ID, an origin address, and a destination address.

11. A non-transitory computer readable storage medium configured to store instructions that when executed cause a processor to perform:

creating, via an Internet of Things (IoT) device, a proposed transaction comprising identifiers of one or more assets;

receiving, via the IoT device, a wireless transfer of a one-time password by near-field communication from a hardware token disposed within a predetermined physical proximity to the IoT device, the one-time password being verifiable based on a public key of a user;

generating, via the IoT device, a blockchain transaction comprising the one-time password that is verifiable based on the public key of the user, a public key of the IoT device, the public key of the user, and content of the proposed transaction, responsive to receiving the wireless transfer;

signing the blockchain transaction with a private key of the IoT device; and transmitting the signed blockchain transaction to a blockchain network.

12. The non-transitory computer readable of claim 11, wherein the processor is further configured to perform:

hashing the public key of the user, the public key of the IoT device, and the content of the proposed transaction, and storing a verifiable hash identifier of the hash in the blockchain transaction.

13. The non-transitory computer readable storage medium of claim 11, wherein the blockchain transaction comprises a list of the one or more assets generated by the IoT device.

14. The non-transitory computer readable storage medium of claim 11, wherein the receiving comprises receiving the one-time password via one or more of a near field communication (NFC) message, a radio frequency identification (RFID) message, and a Bluetooth message, transmitted by the hardware token being brought within the predetermined physical proximity of the IoT device.

* * * * *